United States Patent
Freitag et al.

(10) Patent No.: US 10,460,752 B2
(45) Date of Patent: Oct. 29, 2019

(54) SPIN-TORQUE OSCILLATOR WITH MULTILAYER SEED LAYER BETWEEN THE WRITE POLE AND THE FREE LAYER IN A MAGNETIC RECORDING WRITE HEAD

(71) Applicant: Western Digital Technologies, Inc., San Jose, CA (US)

(72) Inventors: James Mac Freitag, Sunnyvale, CA (US); Zheng Gao, San Jose, CA (US); Masahiko Hashimoto, San Jose, CA (US); Sangmun Oh, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/976,750

(22) Filed: May 10, 2018

(65) Prior Publication Data

US 2019/0279668 A1    Sep. 12, 2019

Related U.S. Application Data

(63) Continuation of application No. 15/372,594, filed on Dec. 8, 2016, now abandoned.

(51) Int. Cl.
  *G11B 5/31*    (2006.01)
  *G11B 5/39*    (2006.01)
  (Continued)

(52) U.S. Cl.
  CPC .......... *G11B 5/3912* (2013.01); *G11B 5/1278* (2013.01); *G11B 5/314* (2013.01);
  (Continued)

(58) Field of Classification Search
  CPC ........ G11B 5/3133; G11B 5/314; G11B 5/315
  (Continued)

(56) References Cited

U.S. PATENT DOCUMENTS

| 6,278,592 B1 | 8/2001 | Xue et al. |
|---|---|---|
| 7,397,633 B2 | 7/2008 | Xue et al. |
| (Continued) | | |

FOREIGN PATENT DOCUMENTS

| CN | 104835510 B | 11/2017 |
|---|---|---|
| JP | 2013251042 A | 12/2013 |
| WO | 2015126326 A1 | 8/2015 |

OTHER PUBLICATIONS

Kittel; On the Theory of Ferromagnetic Resonance Absorption; Physical Review; vol. 73, No. 2; dated Jan. 15, 1948; pp. 155-161.
(Continued)

*Primary Examiner* — Jefferson A Evans
(74) *Attorney, Agent, or Firm* — Patterson & Sheridan, LLP; Steven H. Versteeg

(57) ABSTRACT

A magnetic recording write head and system has a spin-torque oscillator (STO) located between the write head's write pole and trailing shield. The STO's ferromagnetic free layer is located near the write pole with a multilayer seed layer between the write pole and the free layer. The STO's nonmagnetic spacer layer is between the free layer and the STO's ferromagnetic polarizer. The polarizer may be the trailing shield of the write head or a separate polarizer layer. The STO electrical circuitry causes electron flow from the write pole to the trailing shield. The multilayer seed layer removes the spin polarization of electrons from the write pole, which enables electrons reflected from the polarizer layer to become spin polarized, which creates the spin transfer torque on the magnetization of the free layer. The multilayer seed layer includes Mn or a Mn-alloy layer between one or more metal or metal alloy films.

27 Claims, 6 Drawing Sheets

(51) Int. Cl.
*G11B 5/127* (2006.01)
*G11B 5/00* (2006.01)

(52) U.S. Cl.
CPC ............ *G11B 5/315* (2013.01); *G11B 5/3133* (2013.01); *G11B 2005/0024* (2013.01)

(58) Field of Classification Search
USPC ....................................................... 360/125.3
See application file for complete search history.

(56) References Cited

U.S. PATENT DOCUMENTS

| | | | |
|---|---|---|---|
| 7,724,469 B2 | 5/2010 | Gao et al. | |
| 7,982,996 B2 | 7/2011 | Smith et al. | |
| 8,203,192 B2 | 6/2012 | Gao et al. | |
| 8,274,811 B2 | 9/2012 | Zhang et al. | |
| 8,300,356 B2 | 10/2012 | Zhang et al. | |
| 8,339,736 B2 | 12/2012 | Gao et al. | |
| 8,422,159 B2 | 4/2013 | Gao et al. | |
| 8,467,147 B2 | 6/2013 | Sasaki et al. | |
| 8,472,135 B1 | 6/2013 | Kusukawa et al. | |
| 8,582,240 B1 | 11/2013 | Chen et al. | |
| 8,743,507 B1 | 6/2014 | Hassan et al. | |
| 8,837,088 B1 | 9/2014 | Kimura et al. | |
| 8,920,947 B2 | 12/2014 | Zhang et al. | |
| 8,970,996 B2 | 3/2015 | Nagasaka et al. | |
| 9,087,532 B2 | 7/2015 | Shimizu et al. | |
| 9,218,828 B1 | 12/2015 | Koui et al. | |
| 9,230,571 B1 | 1/2016 | Chen et al. | |
| 9,343,090 B1 | 5/2016 | Nishioka et al. | |
| 9,368,135 B2 | 6/2016 | Gao | |
| 9,390,734 B2 | 7/2016 | Gao | |
| 9,673,385 B1* | 6/2017 | Liu | ........................ H01L 43/08 |
| 9,881,637 B1 | 1/2018 | Wilson et al. | |
| 9,934,797 B2* | 4/2018 | Takahashi | ............ G11B 5/3912 |
| 10,121,497 B1 | 11/2018 | Takahashi et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 2008/0304176 A1 | 12/2008 | Takagishi et al. | |
| 2009/0059423 A1 | 3/2009 | Yamada et al. | |
| 2009/0251829 A1 | 10/2009 | Zhang et al. | |
| 2009/0310244 A1 | 12/2009 | Shimazawa et al. | |
| 2011/0096443 A1 | 4/2011 | Zhang et al. | |
| 2011/0134561 A1 | 6/2011 | Smith et al. | |
| 2011/0279921 A1 | 11/2011 | Zhang et al. | |
| 2013/0250456 A1 | 9/2013 | Yamada et al. | |
| 2014/0139952 A1 | 5/2014 | Takeo et al. | |
| 2014/0177100 A1 | 6/2014 | Sugiyama et al. | |
| 2015/0243308 A1 | 8/2015 | Takagishi et al. | |
| 2016/0027455 A1 | 1/2016 | Kudo et al. | |
| 2016/0027456 A1 | 1/2016 | Gao | |
| 2016/0035375 A1 | 2/2016 | Gao | |
| 2017/0148474 A1* | 5/2017 | Okamura | ............ G11B 5/3146 |
| 2017/0236537 A1 | 8/2017 | Murakami et al. | |
| 2017/0256703 A1* | 9/2017 | Zhu | ..................... H01F 10/3286 |
| 2017/0301855 A1* | 10/2017 | Zhang | ..................... H01L 43/08 |
| 2018/0268848 A1 | 9/2018 | Narita et al. | |
| 2019/0088274 A1 | 3/2019 | Narita et al. | |
| 2019/0244635 A1* | 8/2019 | Goncharov | ............. G11B 5/35 |

OTHER PUBLICATIONS

Zhu, et al.; Microwave Assisted Magnetic Recording; IEEE Transactions on Magnetics, vol. 44, No. 1; dated Jan. 2008; pp. 125-131.
Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

* cited by examiner

SPIN-TORQUE OSCILLATOR WITH MULTILAYER SEED LAYER BETWEEN THE WRITE POLE AND THE FREE LAYER IN A MAGNETIC RECORDING WRITE HEAD

CROSS-REFERENCE TO RELATED APPLICATIONS

This application is a continuation of co-pending U.S. patent application Ser. No. 15/372,594, filed Dec. 8, 2016, which is herein incorporated by reference.

BACKGROUND

Field of the Invention

This invention relates generally to magnetic recording systems, and more particularly to a perpendicular magnetic recording (PMR) system with a spin-torque oscillator (STO) incorporated into the write head.

Description of the Related Art

Perpendicular magnetic recording (PMR) in magnetic recording hard disk drives, wherein the recorded bits are stored in a perpendicular or out-of-plane orientation in the magnetic recording layer of the disk, allows for ultra-high recording density, i.e., the areal density of the recorded bits on the disk. However, an increase in recording density requires a corresponding reduction in the size of the magnetic grains in the magnetic recording layer to achieve sufficient medium signal-to-noise ratio. As the size of the magnetic grains is reduced, the magnetocrystalline anisotropy of the magnetic grains must be increased to maintain adequate thermal stability. Simultaneously, the magnetic write field from the write head has to exceed the coercivity of the magnetic recording layer to achieve saturation digital recording, resulting in a conflicted limitation on the anisotropy of the magnetic grains.

PMR systems have been proposed that use a spin-torque oscillator (STO) incorporated into the disk drive's conventional write head. In one type of system using a STO, called microwave-assisted magnetic recording (MAMR), a high frequency oscillatory auxiliary magnetic field from a ferromagnetic free layer or field generation layer (FGL) in the STO is applied to the magnetic grains of the recording layer. The auxiliary field may have a frequency close to the resonance frequency of the magnetic grains in the recording layer to facilitate the switching of the magnetization of the grains at lower write fields from the conventional write head than would otherwise be possible without assisted recording. Conversely, MAMR may be used to increase the coercivity of the magnetic recording layer above that which could be written to by a conventional PMR alone. The increase in coercivity afforded by MAMR allows for a reduction in the size of the magnetic grains and thus a corresponding increase in recording density. MAMR systems are described by J. G. Zhu et al., "Microwave Assisted Magnetic Recording", *IEEE Transactions on Magnetics*, Vol. 44, No. 1, January 2008, pp. 125-131; and in U.S. Pat. No. 7,982,996 B2 and U.S. Pat. No. 8,970,996 B2, both assigned to the same assignee as this application.

In a PMR system with a STO incorporated into the disk drive's conventional write head, even if the oscillatory auxiliary magnetic field from the free layer does not provide microwave assistance to writing, the free layer can have a DC field component that will assist writing by the conventional write head.

In one proposed system, the STO is located between the write pole and the trailing magnetic shield of the write head. The STO electrical circuitry is connected to either separate electrodes, or to the write pole and trailing shield which function as the electrodes. The STO is a multilayer film stack made up of two or more ferromagnetic layers separated by a nonmagnetic electrically-conducting spacer layer. One of the ferromagnetic layers, the free layer, is located adjacent the write pole and is designed to have its magnetization orientation oscillate in the presence of STO current perpendicular to the film planes. Another ferromagnetic layer, the polarizer or polarizing layer (PL), is located adjacent the trailing shield and is designed to supply spin-polarized electrons to the free layer in the presence of the STO current. The STO electrical circuitry supplies DC current to the STO, with the electron flow being from the write pole to the trailing shield. The electrons are reflected from the trailing shield and become spin polarized by the polarizer, which creates the spin transfer torque on the magnetization of the free layer. This destabilizes the static equilibrium of the free layer's magnetization orientation, causing it to undergo sustained oscillation. If the oscillation frequency is near the resonance frequency of the magnetic grains in the recording layer, the switching of the magnetization of the grains will occur at a lower write field from the conventional write head. Even if the oscillation frequency of the free layer has little or no effect on the magnetic grains, the free layer magnetization will have a DC component that can assist writing by the conventional write head.

SUMMARY

In the above-described system, because the write pole is ferromagnetic, the electrons passing from the write pole to the free layer become spin polarized, which is undesirable because they counteract the spin transfer torque from the electrons reflected back from the polarizer. Thus what is needed is a nonmagnetic electrically-conducting seed layer between the write pole and the free layer that removes the spin polarization of the electrons from the write pole without adversely affecting the performance of the STO.

Some embodiments of the invention relate to a magnetic recording write head and system with a spin-torque oscillator (STO) located between the write pole of the write head and a trailing shield. The STO's ferromagnetic free layer is located near the write pole with a multilayer seed layer between the write pole and the free layer. The STO's nonmagnetic spacer layer is between the free layer and the STO's ferromagnetic polarizer. In one embodiment the polarizer is the trailing shield of the write head. In another embodiment the polarizer is a separate ferromagnetic polarizer layer separated from the trailing shield by a nonmagnetic capping layer. The STO electrical circuitry is located between the write pole and the trailing shield, with the electron flow from the write pole to the trailing shield. Because the write pole is magnetic, electrons from the write pole become spin-polarized. The multilayer seed layer removes the spin polarization of electrons from the write pole. This enables electrons reflected from the trailing shield (or polarizer layer) to become spin polarized by the trailing shield (or polarizer layer), which creates the spin transfer torque on the magnetization of the free layer. The multilayer seed layer also ensures proper crystallographic texture of the free layer and optimization of the free layer magnetic and electron transport properties. The multilayer seed layer includes a first layer of one or more metal or metal alloy films adjacent the write pole, a second layer of one or more metal or metal alloy films adjacent the free layer, and a Mn or Mn-alloy layer between the first and second layers.

For a fuller understanding of the nature and advantages of the present invention, reference should be made to the following detailed description taken together with the accompanying figures.

DETAILED DESCRIPTION

Figure 1:
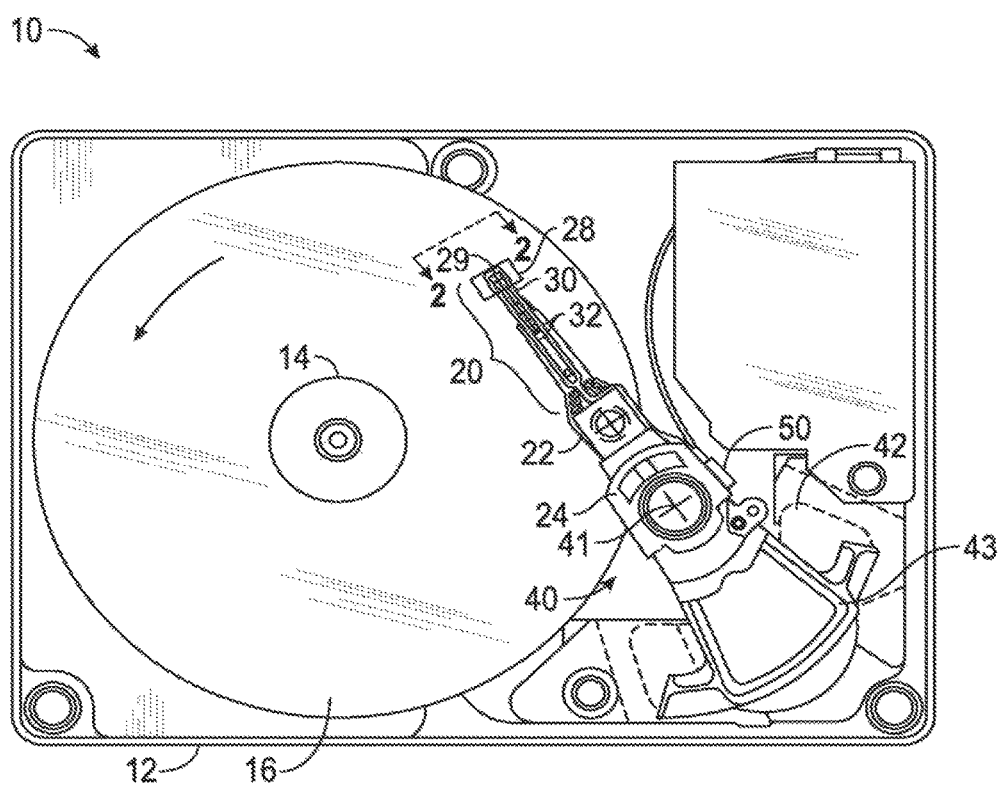
FIG. 1 is a top plan view of a conventional head/disk assembly of a hard disk drive with the cover removed.

FIG. 1 is a top plan view of a conventional head/disk assembly of a hard disk drive 10 with the cover removed. The disk drive 10 includes a rigid base 12 supporting a spindle 14 that supports a stack of disks, including top disk 16. The spindle 14 is rotated by a spindle motor (not shown) for rotating the disks in the direction shown by curved arrow on disk 16. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to an air-bearing slider 28. A magnetic recording read/write head 29 is located at the end or trailing surface 25 of slider 28. In embodiments of this invention the write head 29 will incorporate a spin-torque oscillator (STO) (not shown). The flexure 30 enables the slider 28 to "pitch" and "roll" on an air-bearing generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2A:
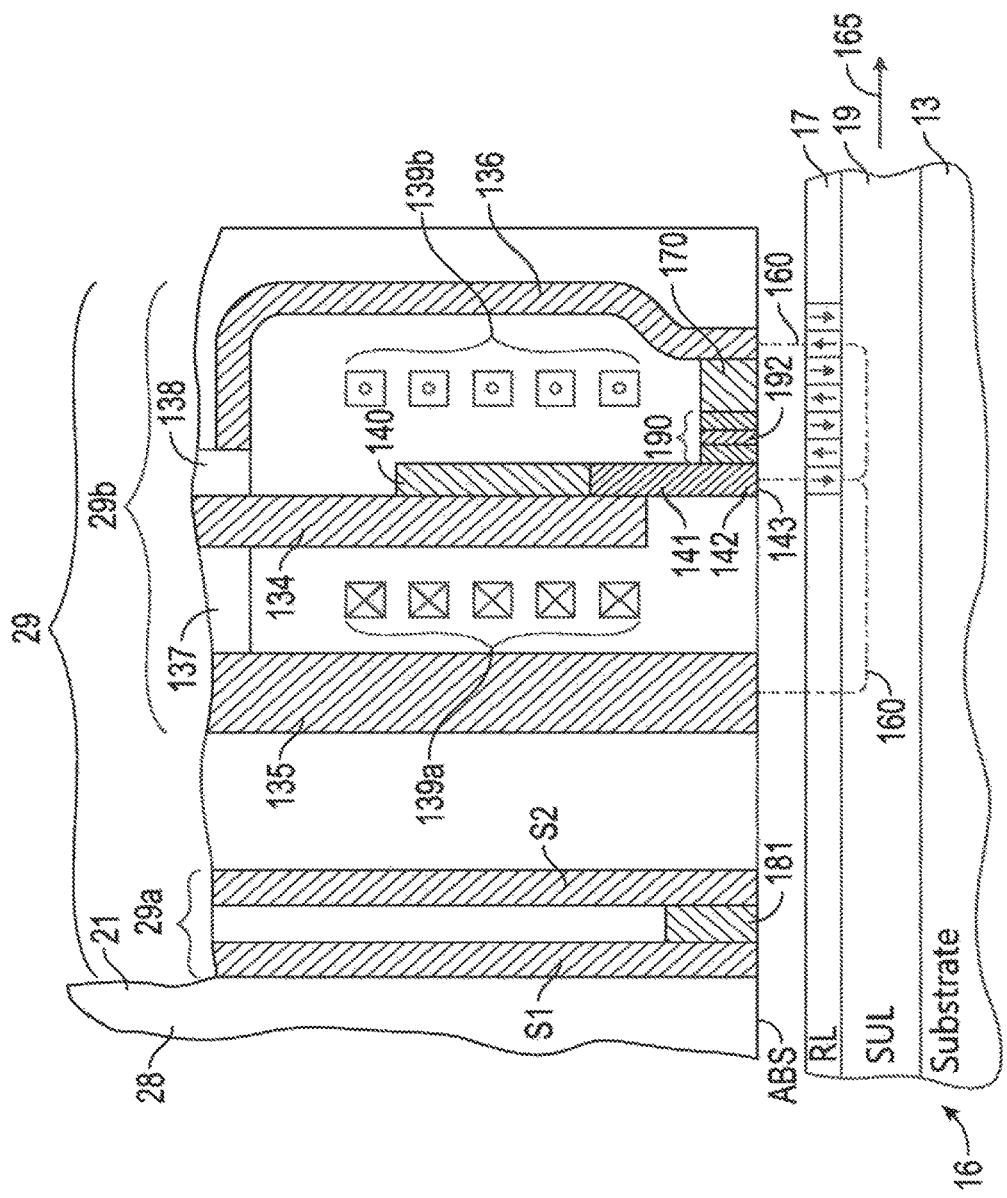
FIG. 2A is a side sectional view of a perpendicular magnetic recording (PMR) write head with an incorporated spin-torque oscillator (STO) as proposed in the prior art, a read head and a recording disk taken through a central plane that intersects a data track on the disk.

FIG. 2A is a side sectional view of a perpendicular magnetic recording write head with an incorporated STO as proposed in the prior art, a read head and a recording disk taken through a central plane that intersects a data track on the disk. As shown in FIG. 2A, a "dual-layer" disk 16 includes a perpendicular magnetic data recording layer (RL) 17 on a "soft" or relatively low-coercivity magnetically permeable underlayer (SUL) 19 formed on the disk substrate 13. The read/write head 29 is formed on slider 28 and includes read head 29a and write head 29b. Read head 29a includes a magnetoresistive (MR) read element or sensor 181 located between two magnetic shields S1, S2. The write head 29b is a single write pole type of perpendicular magnetic recording (PMR) write head and includes a yoke structure with main pole 134, write pole 140, first flux return pole 135, second flux return pole 136, trailing magnetic shield 170, STO 190 between write pole 140 and trailing shield 170, and yoke studs 137, 138 connecting the main pole and return poles 135, 136 respectively. The write head 29b also includes a thin film coil 139a, 139b shown in section around main pole 134. The write coil 139a, 139b is a helical coil wrapped around main pole 134, but the write coil may also be a conventional dual "pancake" coil in which all the coil sections are in substantially the same plane and wrapped around the yoke. A flared write pole (WP) 140 is part of the main pole 134 and has a flared portion 141 and a pole tip 142 with an end 143 that faces the outer surface of disk 16. Write current through coil 139a, 139b induces a magnetic field (shown by dashed line 160) from the WP 140 that passes through the RL 17 (to magnetize the region of the RL 17 beneath the WP 140), through the flux return path provided by the SUL 19, and back to the ends 35a, 36a of return poles 135, 136, respectively.

The read/write head 29 is typically formed as a series of thin films deposited on a trailing surface 21 of air-bearing slider 28 that has its air-bearing surface (ABS) supported above the surface of disk 16. The MR read head 29a is comprised of MR sensor 181 located between MR shields S1 and S2 and is deposited on the trailing end 21 of the slider 28 prior to the deposition of the layers making up the write head 29b. In FIG. 2A, the disk 16 moves past the write head 29b in the direction indicated by arrow 165, so the portion of slider 28 that supports the read head 29a and write head 29b is often called the slider "trailing" end, and the surface 21 perpendicular to the slider ABS on which the write head 29b is located is often called the slider "trailing" surface.

The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits.

FIG. 2A also illustrates a trailing shield (TS) 170 spaced from WP 140. The TS 170 is formed of ferromagnetic material. The STO 190 is located between WP 140 and TS 170. The STO 190 includes a ferromagnetic free layer 192 whose magnetization precesses in the presence of DC current from electrical circuitry (not shown) connected to the WP 140 and the TS 170.

Figure 2B:
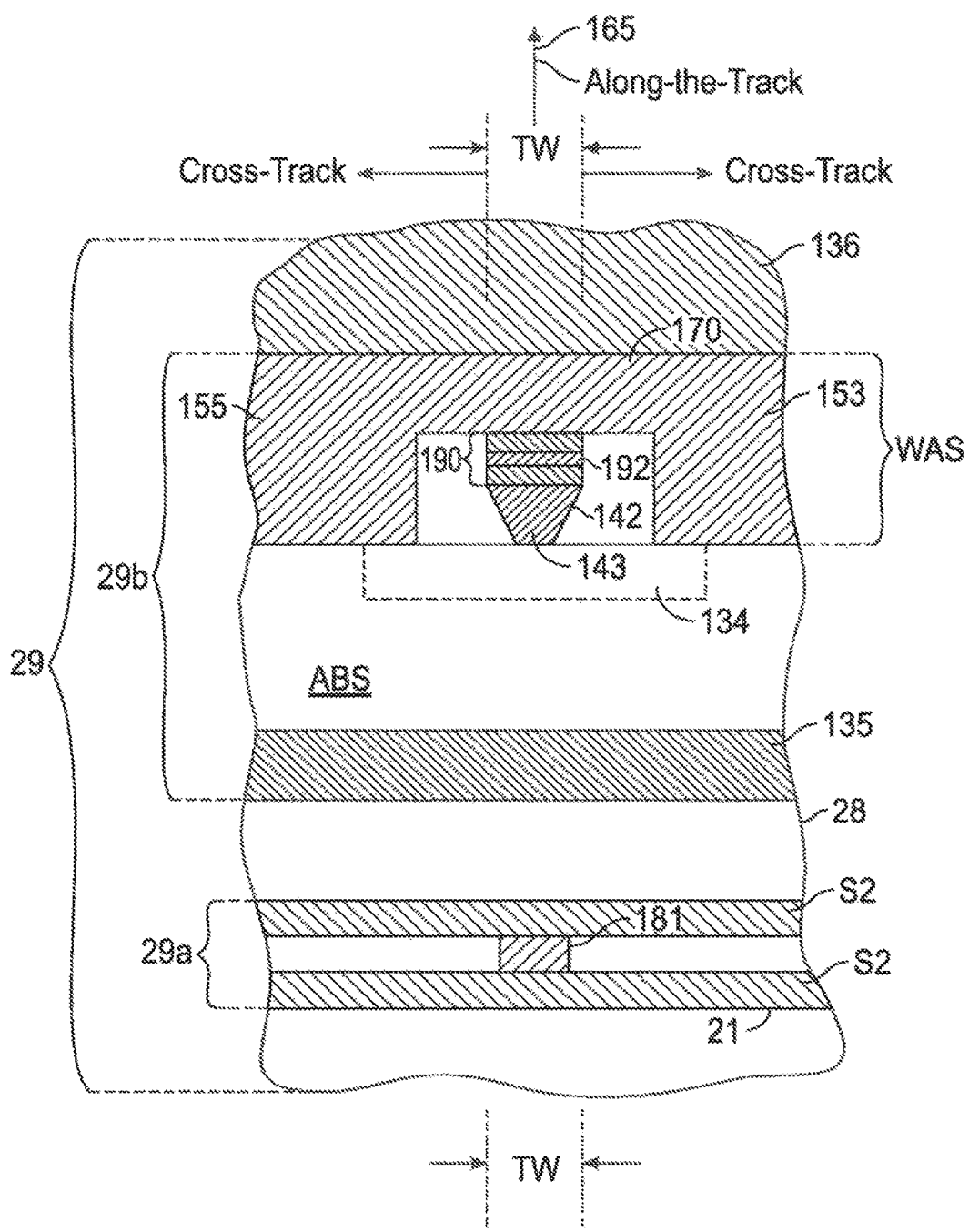
FIG. 2B is a view of the read/write head of FIG. 2A as seen from the disk.

FIG. 2B illustrates the read/write head 29 as seen from the disk 16. The ABS is the recording-layer-facing surface of the slider 28 that faces the disk 16 (FIG. 2A) and is shown without the thin protective overcoat typically present in an actual slider. The recording-layer-facing surface shall mean the surface of the slider 28 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The disk 16 (FIG. 2A) moves relative to the read/write head 29 in the direction 165, which is called the along-the-track direction. The direction perpendicular to direction 165 and parallel to the plane of the ABS is called the cross-track direction. The width of the end 143 of WP tip 142 in the cross-track direction substantially defines the track-width (TW) of the data tracks in the RL 17 (FIG. 2A). The main pole 134 is shown with dashed lines because it is recessed from the ABS (see FIG. 2A).

The portions identified as 153, 155 on opposite ends of TS 170 are side shields which, together with TS 170, form a wraparound shield (WAS) that generally surrounds the WP tip 142. The WAS that includes side shields 153, 155 and TS 170 is described in detail as a shield for a conventional perpendicular recording head in U.S. Pat. No. 7,002,775 B2, assigned to the same assignee as this application. The shields 170, 153, 155 all have ends substantially at the recording-layer-facing surface. The shields 170, 153, 155 are formed as a single-piece structure to form the WAS that substantially surrounds the WP tip 142 and are thus formed of the same material, typically a NiFe, CoFe or NiFeCo alloy, so that they have the same alloy composition. The side shields 153, 155 are separated from WP tip 142 by nonmagnetic gap material. The STO 190 with free layer 192 is located between the WP tip 142 and the TS 170. The WAS alters the angle of the write field and improves the write field gradient at the point of writing, and also shields the writing field at regions of the RL away from the track being written. The WAS is shown as connected to the return pole 136. However, the WAS may be a "floating" WAS shield not connected to either the return pole 136 or other portions of the yoke by flux-conducting material. Also, instead of a WAS, the write head 29b may have separate side shields not connected to the TS 170.

Figure 3A:
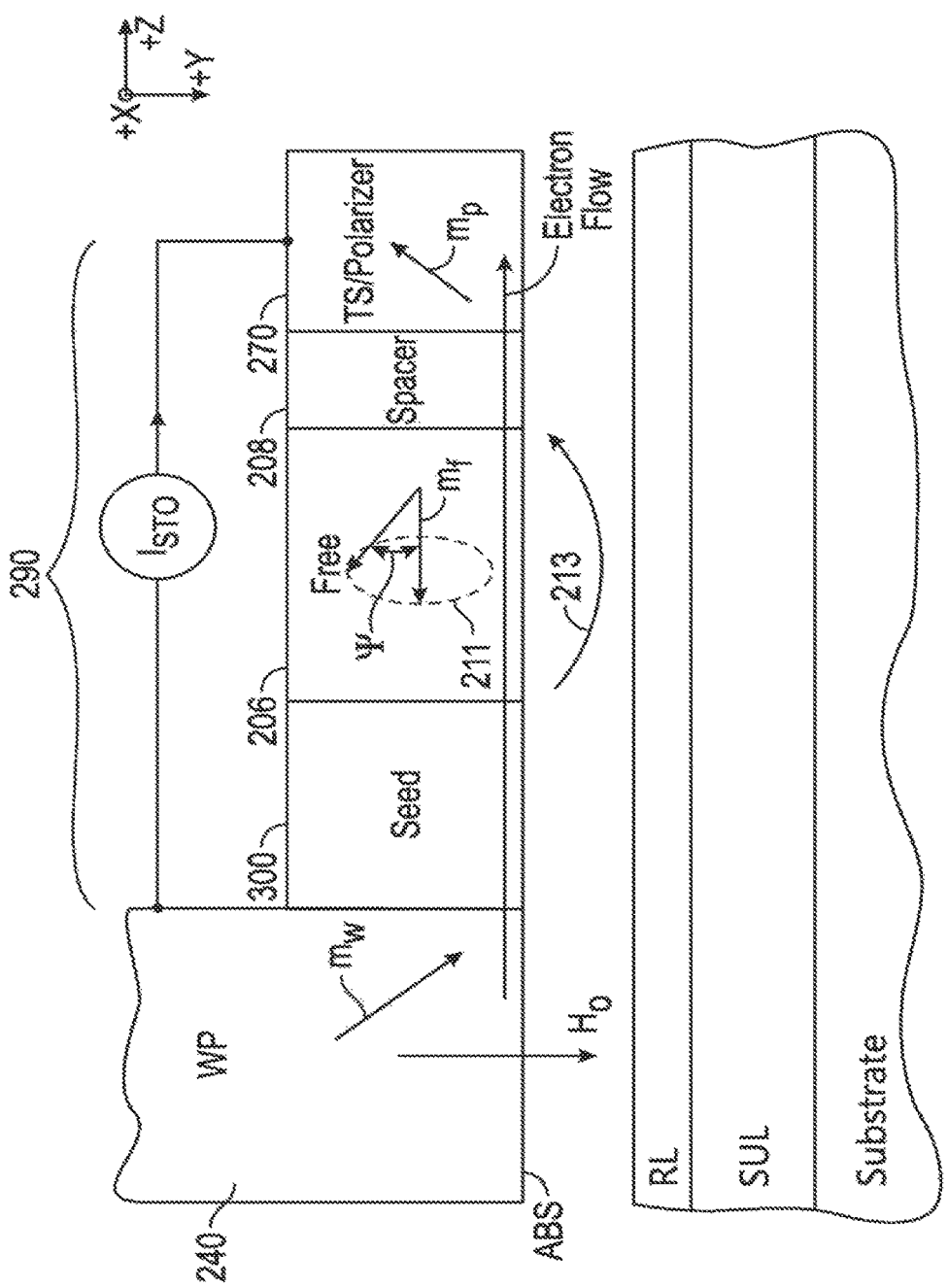
FIG. 3A is a side sectional view of a PMR write head with a STO incorporated into the write head according to an embodiment of the invention.

An embodiment of the invention is a spin-torque oscillator (STO) wherein one of the electrodes connected to the STO is formed of a magnetic material, and a nonmagnetic seed layer is located between the ferromagnetic electrode and the free layer. The other electrode may be formed of a magnetic or nonmagnetic material. FIG. 3A is a side sectional view of a PMR write head with a spin-torque oscillator (STO) 290 incorporated into the write head according to an embodiment of the invention. The WP 240 functions as a first electrode and is formed of a ferromagnetic material. The TS 270 functions as the second electrode, and in this embodiment is also formed of a ferromagnetic material. The STO electrical circuitry is connected between both electrodes and during writing provides DC current $I_{STO}$ between the WP 240 and the TS 270. The WP 240 has a magnetization ($m_w$) and thus generates spin-polarized electrons when write current is applied to the write coil. The electron flow, by convention, is in the opposite direction from the WP 240 to the TS 270. The TS 270, which is formed of ferromagnetic material like CoFe, acts as the polarizer, i.e. the supplier of spin-polarized electrons, for the STO 290 and has a magnetization ($m_p$). The STO's ferromagnetic free layer 206 has an edge substantially at the ABS and has its magnetization ($m_f$) free to rotate. A nonmagnetic spacer layer 208 is located between the free layer 206 and the polarizer/TS 270. The nonmagnetic spacer layer 208 is typically formed of Cu, but may also be formed of other materials like Au or Ag. A nonmagnetic electrically-conducting multilayered seed layer 300 is located between the WP 240 and the free layer 206. The stack of layers making up the STO 290 are formed on the slider body after the write pole 240 is formed, using conventional deposition and lithographic techniques well-known in the fabrication of thin film read/write heads.

In operation of the STO 290, DC current ($I_{STO}$), with a current density J above a critical value $J_C$, is applied across the WP 240 and the TS 270. The flow of electrons is from the WP 240 through the seed layer 300 and free layer 206 to polarizer/TS 270, where the electrons are reflected and become spin-polarized. The reflected spin-polarized electrons apply a spin torque on the magnetization $m_f$ of the free layer 206. This induces a precessional motion of the magnetization $m_f$ of the free layer 206 in the opposite direction to the magnetization of the TS/polarizer layer $m_p$. The polarizer magnetization $m_p$ is oriented slightly up and away from the RL in the presence of the write field $H_0$ from the WP 240. The free layer magnetization $m_f$ makes an angle $\psi$ with the X-Y plane and has a component in the X-Y plane that rotates at an azimuthal angle about the Z-axis with a certain frequency f. The rotation of the free layer magnetization about the Z-axis at this approximately fixed angle $\psi$ is depicted by the oval 211 which represents a circular precessional motion of the tip of the magnetization vector $m_f$ lying in a plane parallel to the X-Y plane. The frequency of precession depends on the properties and thicknesses of the materials making up the STO 290, but for a specific STO the frequency of precession is a function of the values of both $I_{STO}$ and $H_0$.

During writing, the WP 240 applies a write field $H_0$ to the magnetic grains in the recording layer (RL) at the same time the precession of the free layer magnetization $m_f$ from the STO 290 applies an auxiliary ac field at frequency f to the magnetic grains. This results in microwave-assisted magnetic recording (MAMR), which improves the switching of the magnetization of the grains in the RL, with the improvement depending on the frequency f at which the auxiliary field is applied. As is well known in the art, ferromagnetic materials absorb energy from AC magnetic fields more efficiently at or near their ferromagnetic resonance frequency, as described in Kittel C., "On the Theory of Ferromagnetic Resonance Absorption", Phys. Rev. 73. pp. 155-161 (1948). Accordingly, the frequency f of the auxiliary magnetic field from the free layer 206 of the STO 290 is designed to be preferably within a range near the ferromagnetic resonance of the magnetic material making up the grains in the RL, e.g., about 30-50 GHz. As a result, the write field required from the conventional PMR write head can be reduced from what would be required to switch the magnetization of the grains in the RL without MAMR. Conversely, MAMR may be used to increase the coercivity of the RL above that which could be written to by a conventional PMR write head alone. However, even if the frequency f of the auxiliary magnetic field from the free layer 206 is not near the resonance of the magnetic material in the grains of the RL, so that there is no microwave assistance, the magnetization $m_f$ will still provide a DC field component, as shown by arrow 213, that will assist the write field $H_0$. When write current from the coil is switched, the write field is switched from the direction into the RL (as depicted in FIG. 3A) to out of the RL, which results in a switching of directions of the magnetizations $m_w$, $m_p$ and $m_f$, as well as the direction of DC field component 213.

Figure 3B:
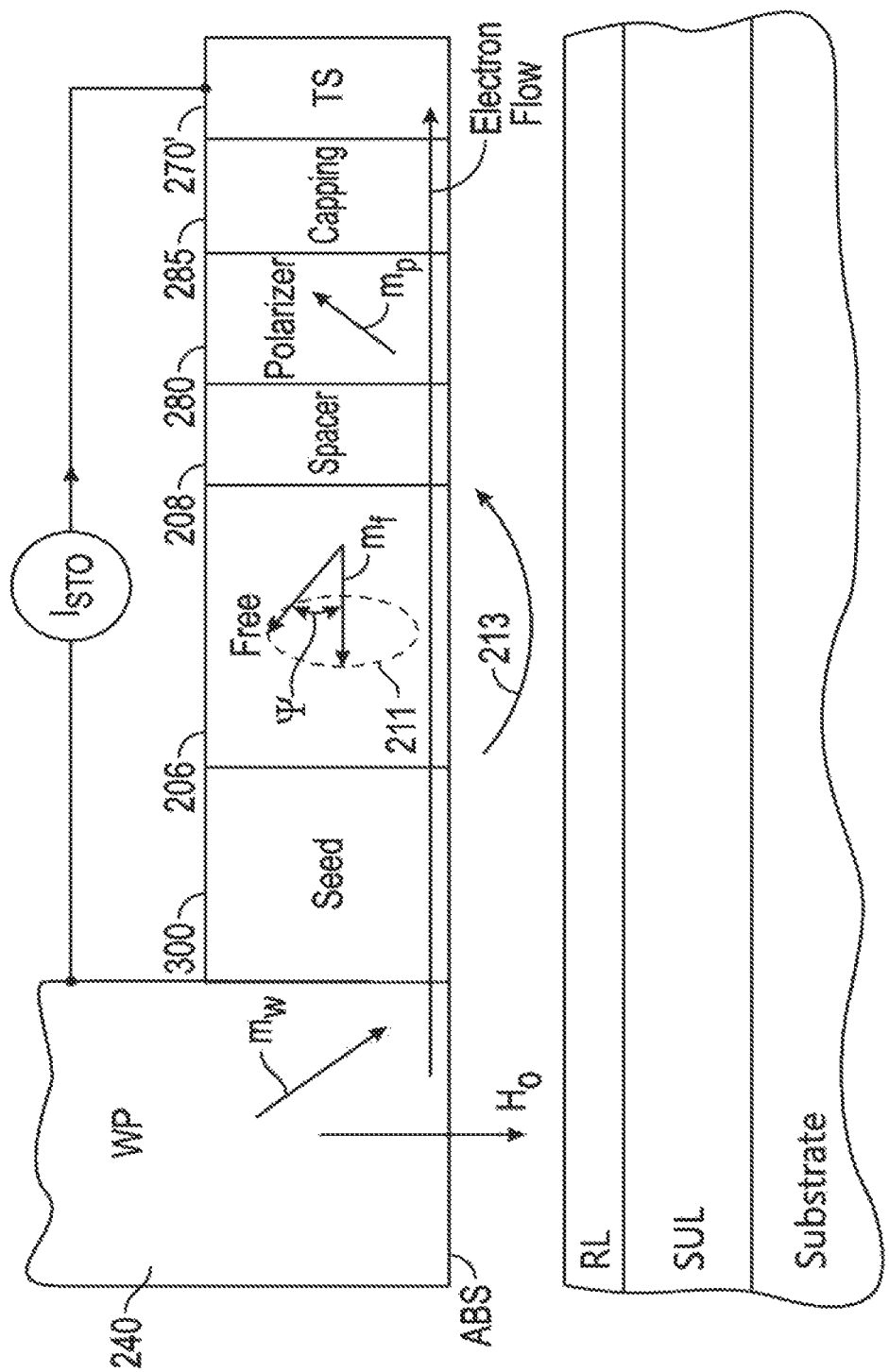
FIG. 3B is a side sectional view of a PMR write head with a STO incorporated into the write head according to another embodiment of the invention.

FIG. 3B is a side sectional view of the write head with incorporated STO according to another embodiment of the invention. In this embodiment there is a separate polarizer layer 280 adjacent the spacer layer 208 and a nonmagnetic capping layer 285 between the polarizer layer 280 and the TS 270'. The polarizer layer 280 may be formed of a magnetic material like CoFe, and the capping layer 285 may be formed of a layer or multilayer of metals or metal alloys like Ru, Ir, Ta and Ti.

Figure 4:
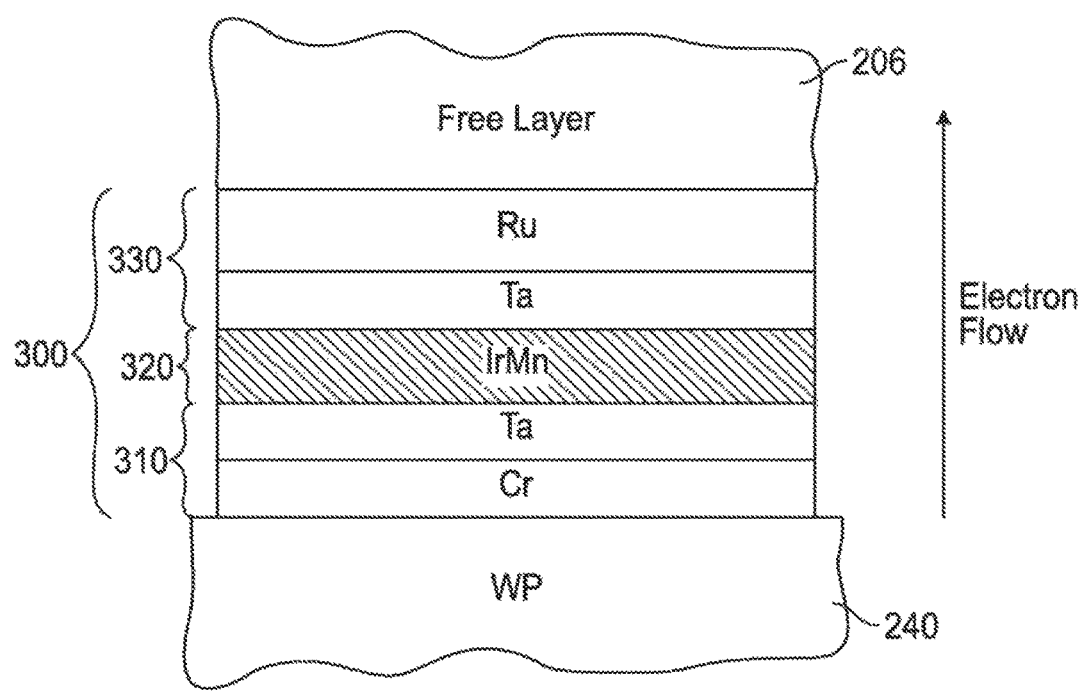
FIG. 4 is a sectional view showing the multilayer seed layer between the write pole and the free layer according to an embodiment of the invention.

FIG. 4 is a sectional view showing the multilayer seed layer 300 and free layer 206 according to an embodiment of the invention. The seed layer 300 is a multilayer comprising a Mn-alloy layer 320, a first layer 310 of one or more metal or metal alloy films between the WP 240 and the layer 320, and a second layer 330 of one or more metal or metal alloy films between layer 320 and the free layer 206. The first layer 310 is selected from one or more films selected from one or more of Cu, Cr, Ta, Ru, Hf and Nb, and the second layer 330 is selected from one or more films of one or more of Cu, Cr, Ta, Ru, Hf, Nb and NiAl. The intermediate layer 320 between the first and second layers comprises Mn or an alloy of Mn and one or more of It, Pt, Ni, Fe, Pd, Rh, Cu, Ta, Cr, Ru, Hf and Nb. In the embodiment depicted in FIG. 4, the first layer 310 is a Cr/Ta bilayer, the intermediate layer 320 is a IrMn alloy and the second layer 330 is a Ta/Ru bilayer. A film of Ru alloy is the preferred film to be located adjacent free layer 206. For free layers with ordered phases such as Heusler alloys, an additional NiAl alloy film can be inserted in layer 330 adjacent the free layer. In the preferred embodiment the layer 310 is a Mn-based alloy comprising Ir and Mn. The Mn or Mn-alloy film has a short spin diffusion length, i.e., the length over which the polarization of the electron current is destroyed owing to spin flip scattering, so that it can be relatively thin and still act to destroy the polarization of electrons flowing from the magnetic WP 240. The total thickness of seed layer 300 is preferably greater than or equal to 0.5 nm and less than or equal to 12 nm, and the thickness of the Mn or Mn-alloy intermediate layer is preferably greater than or equal to 0.1 nm and less than or equal to 0.5 nm.

The ferromagnetic free layer 206 may be formed of conventional ferromagnetic materials such as NiFe and CoFe alloys, but may also be formed of or comprise a ferromagnetic Heusler alloy, some of which are known to exhibit high spin-polarization in their bulk form. Full and half Heusler alloys are intermetallics with particular composition and crystal structure. Examples of Heusler alloys include but are not limited to the full Heusler alloys $Co_2MnX$ (where X is one or more of Al, Sb, Si, Sn, Ga, or Ge) and $Co_2FeZ$ (where Z is one or more of Ge, Si, Al, Sn or Ga). Examples also include but are not limited to the half Heusler alloys NiMnSb, and PtMnSb. A perfect Heusler alloy will have 100% spin-polarization. However it is possible that in a thin-film form and at finite temperatures, the band structure of the Heusler alloy may deviate from its ideal half metal structure and that the spin polarization will decrease. For example, some alloys may exhibit chemical site disorder and crystallize in the B2 structure instead of the L21 Heusler structure. Nevertheless, the spin polarization may exceed that of conventional ferromagnetic alloys. Thus, as used herein a "Heusler alloy" shall mean an alloy with a composition substantially the same as that of a known Heusler alloy, and which results in enhanced spin polarization compared to conventional ferromagnetic materials such as NiFe and CoFe alloys.

A STO with a seed layer according to an embodiment of the invention with a structure of (Cr-2 nm/Ta-0.75 nm/IrMn-1 nm/Ta-0.75 nm/Ru-1.5 nm) was compared with a STO with a seed layer of the same thickness (6 nm) but without an IrMn intermediate layer and with a structure of (Cr-2 nm/Ta-2 nm/Ru-2 nm). The free layer for both STOs was formed of a $Co_2MnGe$ Heusler alloy. The magnetic moment ($B_st$) of the Heusler alloy free layer was unchanged by the replacement of a portion of the Ta and Ru films with the IrMn intermediate layer, indicating that the preferred texture of the seed layer was preserved. The STO with the IrMn intermediate layer in the seed layer exhibited higher delta resistance-area product (ΔRA), which indicates an improvement in the STO properties. The multilayer seed layer thus ensures proper crystallographic texture of the free layer and optimization of the free layer magnetic and electron transport properties. More importantly, the critical current $J_C$ for the STO with the IrMn intermediate layer in the seed layer was 19% less than the $J_C$ for the STO without the IrMn in the seed layer.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A spin torque oscillator (STO) comprising:
a first electrically conductive electrode formed of a ferromagnetic material;
a ferromagnetic free layer;
a nonmagnetic electrically conductive seed layer between the first electrode and the free layer, wherein the seed layer comprises a first layer selected from one or more films selected from one or more of Cu, Cr, Ta, Ru, Hf and Nb adjacent the first electrode, a second layer selected from one or more films of one or more of Cu, Cr, Ta, Ru, Hf, Nb and NiAl adjacent the free layer, and an intermediate layer between said first and second layers and selected from Mn and an alloy of Mn and one or more of Ir, Pt, Ni, Fe, Pd, Rh, Cu, Ta, Cr, Ru, Hf and Nb;
a ferromagnetic polarizer;
a nonmagnetic spacer layer between the free layer and the polarizer, wherein the free layer is located between the write pole and the polarizer;
a second electrically conductive electrode; and
electrical circuitry connected to the first and second electrodes.

2. The STO of claim 1 wherein the intermediate layer consists of a IrMn alloy.

3. The STO of claim 1 wherein the second layer comprises a film selected from a Ru film and a NiAl film.

4. The STO of claim 1 wherein each of the first and second layers comprises a Ta film.

5. The STO of claim 1 wherein the free layer comprises a ferromagnetic Heusler alloy selected from the group consisting of Co2MnX (where X is selected from the group consisting of Al, Sb, Si, Sn, Ga, and Ge), Co2FeZ (where Z is selected from one or more of Ge, Si, Al, Sn or Ga), NiMnSb and PtMnSb.

6. The STO of claim 1 wherein the second electrode is formed of a ferromagnetic material.

7. The STO of claim 1 wherein the polarizer comprises said second electrode.

8. A magnetic recording write head for magnetizing regions in a magnetic recording layer, the write head comprising:
a write pole;
a spin torque oscillator (STO) comprising a ferromagnetic free layer, a nonmagnetic electrically conductive seed layer between the write pole and the free layer, a ferromagnetic polarizer, and a nonmagnetic spacer layer between the free layer and the polarizer, wherein the free layer is located between the write pole and the polarizer; and wherein the seed layer comprises a first layer selected from one or more films selected from one or more of Cu, Cr, Ta, Ru, Hf and Nb adjacent the write pole, a second layer selected from one or more films of one or more of Cu, Cr, Ta, Ru, Hf, Nb and NiAl adjacent the free layer, and an intermediate layer between said first and second layers and selected from Mn and an alloy of Mn and one or more of Ir, Pt, Ni, Fe, Pd, Rh, Cu, Ta, Cr, Ru, Hf and Nb.

9. The head of claim 8 wherein the intermediate layer consists of a IrMn alloy.

10. The head of claim 8 wherein the second layer comprises a film selected from a Ru film and a NiAl film.

11. The head of claim 8 wherein each of the first and second layers comprises a Ta film.

12. The head of claim 8 wherein the seed layer has a thickness greater than or equal to 0.5 nm and less than or equal to 12 nm, and the intermediate layer has a thickness greater than or equal to 0.1 nm and less than or equal to 0.5 nm.

13. The head of claim 8 wherein the free layer comprises a ferromagnetic Heusler alloy selected from the group consisting of Co2MnX (where X is selected from the group consisting of Al, Sb, Si, Sn, Ga, and Ge), Co2FeZ (where Z is selected from one or more of Ge, Si, Al, Sn or Ga), NiMnSb and PtMnSb.

14. The head of claim 8 wherein the polarizer comprises a trailing shield.

15. The head of claim 8 further comprising a trailing shield and a nonmagnetic capping layer between the polarizer and the trailing shield.

16. The head of claim 8 further comprising electrical circuitry connected to the write pole and the STO and wherein the free layer is adapted to provide microwave-assisted magnetic recording to the recording layer in the presence of current through said electrical circuitry.

17. The head of claim 8 further comprising an electrically conductive coil coupled to the write pole, the write pole adapted to generate a magnetic write field in the presence of electrical write current through the coil, and STO electrical circuitry between the write pole and the polarizer for directing electron flow from the write pole to the polarizer.

18. A magnetic recording system comprising:
the write head of claim 17; and
a magnetic recording medium having a perpendicular magnetic recording layer.

19. A magnetic recording disk drive perpendicular recording write head for magnetizing regions in data tracks of a perpendicular magnetic recording layer on a disk, the head being formed on a slider having an air bearing surface (ABS) and comprising:
a substrate;
a write pole on the substrate and having an end substantially at the ABS;
an electrically conductive coil coupled to the write pole, the write pole capable of generating a magnetic write field in the presence of electrical write current through the coil;
a spin-torque oscillator (STO) comprising a stack of layers on the write pole, said stack including a nonmagnetic electrically conductive seed layer on the write pole, a ferromagnetic free layer on the seed layer and having and edge substantially at the ABS, a nonmagnetic spacer layer on the free layer and a polarizing layer on the spacer layer; and
electrical circuitry coupled to the write pole and the STO and capable of supplying direct current to cause electron flow from the write pole to the polarizing layer when write current is supplied to the coil; and
wherein said seed layer comprises a first layer selected from one or more films of one or more of Cu, Cr, Ta, Ru, Hf and Nb adjacent the write pole, a second layer selected from one or more films of one or more of Cu, Cr, Ta, Ru, Hf, Nb and NiAl adjacent the free layer, and an intermediate layer between said first and second layers and selected from Mn and an alloy of Mn and one or more of Ir, Pt, Ni, Fe, Pd, Rh Cu, Ta, Cr, Ru, Hf, and Nb.

20. The head of claim 19 wherein the intermediate layer consists of an IrMn alloy.

21. The head of claim 19 wherein the second layer comprises a film selected from a Ru film and a NiAl film.

22. The head of claim 19 wherein each of the first and second layers comprises a Ta film.

23. The head of claim 19 wherein the seed layer has a thickness greater than or equal to 0.5 nm and less than or equal to 12 nm, and the intermediate layer has a thickness greater than or equal to 0.1 nm and less than or equal to 0.5 nm.

24. The head of claim 19 wherein the free layer comprises a ferromagnetic Heusler alloy selected from the group consisting of Co2MnX (where X is selected from the group consisting of Al, Sb, Si, Sn, Ga, and Ge), Co2FeZ (where Z is selected from one or more of Ge, Si, Al, Sn or Ga), NiMnSb and PtMnSb.

25. The head of claim 19 wherein the polarizing layer comprises a trailing shield.

26. The head of claim 19 further comprising a trailing shield and a nonmagnetic capping layer between the polarizing layer and the trailing shield.

27. A magnetic recording disk drive comprising:
the write head of claim 19; and
a magnetic recording disk having a perpendicular magnetic recording layer.

* * * * *